United States Patent
Jeong et al.

(10) Patent No.: US 11,048,142 B2
(45) Date of Patent: Jun. 29, 2021

(54) SYSTEM AND METHOD FOR DRIVING BEAM STEERING DEVICE INCLUDING METASURFACE OPTICAL PHASED ARRAY

(71) Applicant: SAMSUNG ELECTRONICS CO., LTD., Suwon-si (KR)

(72) Inventors: Byunggil Jeong, Anyang-si (KR); Sunil Kim, Osan-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 253 days.

(21) Appl. No.: 16/262,362

(22) Filed: Jan. 30, 2019

(65) Prior Publication Data
US 2020/0081316 A1   Mar. 12, 2020

(30) Foreign Application Priority Data
Sep. 11, 2018   (KR) .................. 10-2018-0108526

(51) Int. Cl.
*G02F 1/29*   (2006.01)

(52) U.S. Cl.
CPC .......... *G02F 1/292* (2013.01); *G02F 2203/24* (2013.01)

(58) Field of Classification Search
CPC ....... G02B 1/002; G02B 5/008; G02F 1/0018; G02F 1/0063; G02F 1/29; G02F 1/292; G02F 2203/10; G02F 2203/50; G02F 2203/24
USPC ........................................................ 359/315
See application file for complete search history.

(56) References Cited

U.S. PATENT DOCUMENTS

| | | | |
|---|---|---|---|
| 5,151,814 A * | 9/1992 | Grinberg | G02B 27/0087 349/202 |
| 2017/0068214 A1 | 3/2017 | Tsai et al. | |
| 2018/0024412 A1 | 1/2018 | Kim et al. | |
| 2018/0052378 A1 | 2/2018 | Shin et al. | |
| 2019/0033682 A1* | 1/2019 | Kafaie Shirmanesh | G02F 1/292 |

FOREIGN PATENT DOCUMENTS

| JP | 4475876 B2 | 6/2010 |
|---|---|---|
| KR | 10-2018-0010583 A | 1/2018 |
| KR | 10-2018-0020035 A | 2/2018 |

OTHER PUBLICATIONS

Ghazaleh Kafaie Shirmanesh et al., "Dual-Gated Active Metasurface at 1550 nm with Wide (>300°) Phase Tunability", Nano Letters, Mar. 23, 2018, pp. 1-14. (15 pages total).

* cited by examiner

*Primary Examiner* — Mahidere S Sahle
(74) *Attorney, Agent, or Firm* — Sughrue Mion, PLLC

(57) ABSTRACT

Provided is a driving method for a beam steering device having a metasurface optical phased array, the beam steering device includes a nano-antenna, a conductor, and an active layer arranged therebetween. The driving method includes comparing a first voltage to be applied to a first electrode of one of the nano-antenna and the conductor, with a second voltage applied immediately before the first voltage, and applying a correction voltage the first electrode of the other of the nano-antenna and the conductor and then applying the first voltage. The correction voltage is applied to the first electrode and has an electrical polarity different from an electrical polarity of the second voltage.

19 Claims, 6 Drawing Sheets

SYSTEM AND METHOD FOR DRIVING BEAM STEERING DEVICE INCLUDING METASURFACE OPTICAL PHASED ARRAY

CROSS-REFERENCE TO RELATED APPLICATION

This application claims priority from Korean Patent Application No. 10-2018-0108526, filed on Sep. 11, 2018 in the Korean Intellectual Property Office, the disclosure of which is incorporated herein in its entirety by reference.

BACKGROUND

1. Field

Example embodiments of the present disclosure relate to systems and methods for driving a beam steering device including a metasurface optical phased array.

2. Description of the Related Art

A beam steering device including a metasurface optical phased array steers an incident beam to a desired position by using an optical phased array of nano-antennas. The optical phased array uses a surface plasmon resonance phenomenon of incident light. The beam steering device may apply a voltage to adjacent channels to provide a constant phase difference to light reflected from the adjacent channels and steer a beam at a certain angle due to interference between beams reflected from the adjacent channels.

When the voltage applied to the beam steering device including an active layer is changed, phase characteristics of light are changed by a change in charge density at an interface of the active layer. When the applied voltage is removed, the charge density at the interface of the active layer is not restored to an original state due to hysteresis of the charge resulting from the applied voltage, such that the desired phase characteristics are not obtained. Therefore, the quality of the beam reflected from the beam steering device may decrease and the beam may not be steered in a desired direction.

SUMMARY

One or more example embodiments provide systems and methods for driving a beam steering device including a metasurface optical phased array configured to steer a beam in a desired direction.

Additional aspects will be set forth in part in the description which follows and, in part, will be apparent from the description, or may be learned by practice of example embodiments.

According to an aspect of an example embodiment, there is provided a driving system of a beam steering device having a metasurface optical phased array, the beam steering device including a nano-antenna, a conductor, and an active layer disposed between the nano-antenna and the conductor, the driving system including a voltage comparator configured to compare an electrical polarity and an absolute level of a first voltage to be applied to a first electrode of one of the nano-antenna and the conductor, with an electrical polarity and an absolute level of a second voltage which was applied to the first electrode of the one of the nano-antenna and the conductor immediately before the first voltage is to be applied to the first electrode of the one of the nano-antenna and the conductor, and output a result of the comparison, and a controller configured to control a power supply of the beam steering device to output, based on the result of the comparison output from the voltage comparator, the first voltage which is applied the first electrode of the one of the nano-antenna and the conductor when the electrical polarity of the first voltage is different from the electrical polarity of the second voltage and when the electrical polarity of the first voltage is the same as the electrical polarity of the second voltage and the absolute level of the first voltage is the same as or greater than the absolute level of the second voltage, and to control the power supply of the beam steering device to output a correction voltage when the electrical polarity of the first voltage is the same as the electrical polarity of the second voltage and the absolute level of the first voltage is less than the absolute level of the second voltage.

An electrical polarity of the correction voltage may be different from the electrical polarity of the second voltage.

An absolute level of the correction voltage may be less than the absolute level of the second voltage.

A voltage weight of the correction voltage obtained by multiplying an absolute level of the correction voltage by a period of the correction voltage may be less than a voltage weight of the second voltage obtained by multiplying the absolute level of the second voltage by a period of the second voltage.

The voltage weight of the correction voltage may be ¼ to ¾ of the voltage weight of the second voltage.

The correction voltage may be applied to the first electrode.

The beam steering device may include a first dielectric layer disposed between the active layer and the conductor, and a second dielectric layer disposed between the active layer and the nano-antenna, and the first voltage and the second voltage are applied to the first electrode, and wherein the correction voltage may be applied to a second electrode of the other one of the nano-antenna and the conductor.

An electrical polarity of the correction voltage may be the same as the electrical polarity of the second voltage.

According to an aspect of an example embodiment, there is provided a driving method for a beam steering device that a metasurface optical phased array including a nano-antenna, a conductor, and an active layer disposed between the nano-antenna and the conductor, the driving method includes comparing a first voltage to be applied to a first electrode of one of the nano-antenna and the conductor, with a second voltage that was applied to the first electrode of the one of the nano-antenna and the conductor immediately before the first voltage is to be applied to the first electrode, and applying a correction voltage prior to applying the first voltage to the first electrode of the one of the nano-antenna and the conductor.

The applying of the correction voltage may include determining whether an electrical polarity of the first voltage is same as an electrical polarity of the second voltage, determining whether an absolute level of the first voltage is same as or greater than an absolute level of the second voltage when the electrical polarity of the first voltage is determined to be the same as the electrical polarity of the second voltage, applying the first voltage when the absolute level of the first voltage is the same as or greater than the absolute level of the second voltage, applying the correction voltage and then applying the first voltage when the absolute level of the first voltage is less than the absolute level of the second voltage, and applying the first voltage when the electrical polarity of the first voltage is different from the electrical polarity of the second voltage.

An electrical polarity of the correction voltage may be different from the electrical polarity of the second voltage.

An absolute level of the correction voltage may be less than the absolute level of the second voltage.

A voltage weight of the correction voltage obtained by multiplying an absolute level of the correction voltage by a period of the correction voltage may be less than a voltage weight of the second voltage obtained by multiplying the absolute level of the second voltage by a period of the second voltage.

The voltage weight of the correction voltage may be ¼ to ¾ of the voltage weight of the second voltage.

The correction voltage is applied to the first electrode.

The beam steering device may include a first dielectric layer disposed between the active layer and the conductor, and a second dielectric layer disposed between the active layer and the nano-antenna, the first voltage and the second voltage are applied to the first electrode and wherein the correction voltage may be applied to the second electrode of the other one of the nano-antenna and the conductor.

An electrical polarity of the correction voltage may be same as the electrical polarity of the second voltage.

An absolute level of the correction voltage may be less than the absolute level of the second voltage.

A voltage weight of the correction voltage obtained by multiplying an absolute level of an correction voltage by a period of the correction voltage may be less than a voltage weight of the second voltage obtained by multiplying the absolute level of the second voltage by a period of the second voltage.

The voltage weight of the correction voltage may be ¼ to ¾ of the voltage weight of the second voltage.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
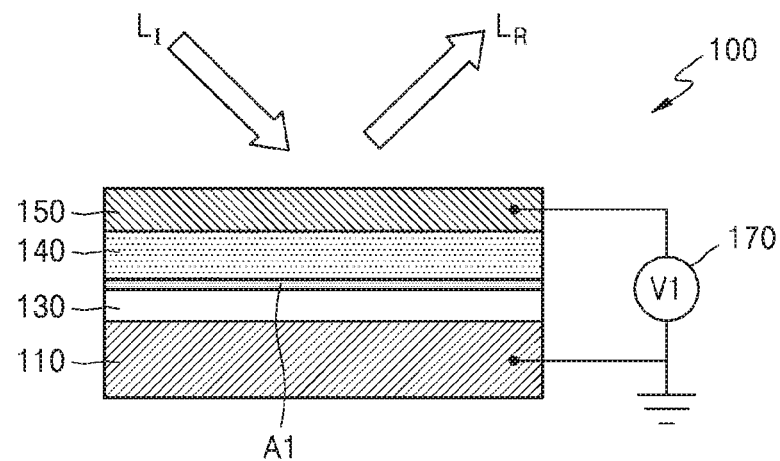
FIG. 1 is a cross-sectional view of a beam steering device including a metasurface optical phased array to which a driving method according to an example embodiment is applied.

Reference will now be made in detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, example embodiments are merely described below, by referring to the figures, to explain aspects.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the case where a position relationship between two items is described with the terms "on ~," "on the top of ~," or the like, one or more items may be interposed therebetween unless the term "directly" is used in the expression.

It will be further understood that the terms "comprises" and/or "comprising" used herein specify the presence of stated features or components, but do not preclude the presence or addition of one or more other features or components.

The use of the terms "a" and "an" and "the" and similar referents in the context of describing the present disclosure are to be construed to cover both the singular and the plural.

Also, the steps of all methods described herein can be performed in any suitable order unless otherwise indicated herein or otherwise clearly contradicted by context. Embodiments are not limited to the described order of the steps. The use of any and all examples, or exemplary language (e.g., "such as") provided herein, is intended merely to better illuminate example embodiments and does not pose a limitation on the scope of example embodiments unless otherwise claimed.

Figure 2:
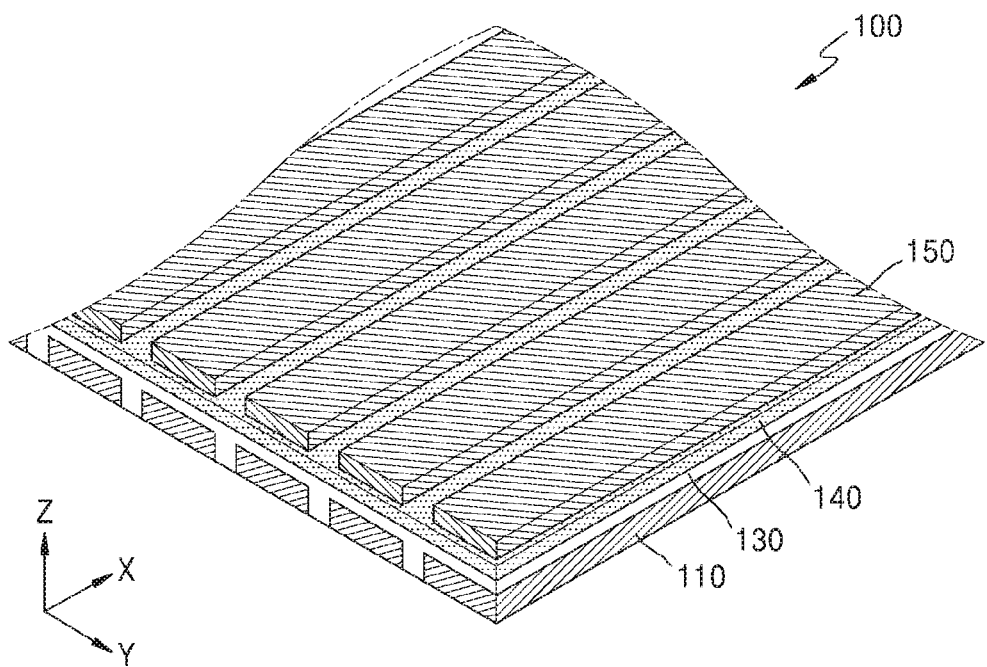
FIG. 2 is a partial perspective view of a beam steering device including a metasurface optical phased array to which a driving method according to an example embodiment is applied.

FIG. 1 is a cross-sectional view of a beam steering device 100 including a metasurface optical phased array to which a driving method according to an example embodiment is applied. FIG. 2 is a perspective view of the beam steering device 100 including a metasurface optical phased array to which a driving method according to an example embodiment is applied. FIG. 1 is a unit cell of the beam steering device 100.

The beam steering device 100 may include unit cells arranged in a one-dimensional or two-dimension manner. FIG. 2 shows the unit cells of the beam steering device 100 arranged in a one-dimensional manner. An arrangement of the unit cells of the beam steering device 100 arranged in a two-dimensional manner will be described later with reference to FIG. 8.

Referring to FIG. 1, the beam steering device 100 includes an active layer 130 and a nano-antenna 150 which are sequentially stacked on a conductor 110. A dielectric layer 140 may be formed between the active layer 130 and the nano-antenna 150. There may be a first power supply 170 applying a first voltage V1 between the nano-antenna 150 and the conductor 110. One nano-antenna 150 corresponding to one conductor 110 is shown in FIG. 2, but embodiments are not limited thereto. For example, a plurality of nano-antennas 150 may be formed to correspond one conductor 110.

The nano-antenna 150 may be a plasmonic nano-antenna. A charge concentration (charge density) of a first region A1 of a surface of the active layer 130 changes depending on the first voltage V1. In FIG. 1, a ground voltage is applied to the conductor 110 and a driving voltage is applied to the nano-antenna 150. A dielectric permittivity of the first region A1 of the active layer 130 changes depending on the driving voltage. The first region A1 of the active layer 130 may be formed adjacent to the dielectric layer 140. The dielectric layer 140 may be an insulating layer configured to electrically separate the nano-antenna 150 from the active layer 130.

In FIG. 1, a driving voltage is applied to the nano-antenna 150 through the first power supply 170, and the conductor 110 is grounded. However, embodiments are not limited thereto. For example, the dielectric layer 140 may be arranged between the active layer 130 and the conductor 110, a driving voltage may be applied to the conductor 110 through the first power supply 170, and the nano-antenna 150 may be grounded.

The nano-antenna 150 may convert light of a particular wavelength, for example, infrared light into a state of localized surface plasmon resonance and capture an energy thereof, and may be an antenna having a nanostructure with respect to light. The nano-antenna 150 may be a conductive layer pattern, and the conductive layer pattern may be in contact with a non-conductive layer, e.g., the dielectric layer 140. Plasmon resonance may occur at an interface between the conductive layer pattern and the non-conductive layer. The non-conductive layer may be the dielectric layer 140 or may be another dielectric layer separately disposed from the dielectric layer 140. The conductive layer pattern may be the nano-antenna 150 in the following description. An interface at which surface plasmon resonance occurs, such as the interface between the conductive layer pattern and the non-conductive layer, may be collectively referred to as a metasurface or a metastructure.

The nano-antenna 150 may include a conductive material and may have a sub-wavelength dimension. The sub-wavelength is a dimension less than an operating wavelength of the nano-antenna 150. At least one of the dimensions of the nano-antenna 150, for example, a thickness, a width, a length, or a space between the nano-antennas 150 may have the sub-wavelength dimension. A resonant wavelength may be varied depending on a shape and a dimension of the nano-antenna 150. FIG. 2 shows the nano-antenna 150 having a shape of a rectangular parallelepiped which has a long length in one direction.

The nano-antenna 150 may include a metal having high conductivity, in which surface plasmon excitation may occur. The nano-antenna 150 may include copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), gold (Au), or an alloy thereof. The nano-antenna 150 may include a thin film in which metal nanoparticles such as Au or Ag is dispersed, a carbon nanostructure such as graphene or carbon nanotube, a conductive polymer such as poly(3, 4-ethylene dioxythiophene) (PEDOT), polypyrrole (PPy), or poly(3-hexylthiophene) (P3HT), or a conductive oxide.

The active layer 130 may include a transparent conductive oxide such as indium tin oxide (ITO), indium zinc oxide (IZO), aluminum zinc oxide (AZO), gallium zinc oxide (GZO), aluminum gallium zinc oxide (AGZO), or gallium indium zinc oxide (GIZO). The active layer 130 may include a transition metal nitride such as titanium nitride (TiN), zirconium nitride (ZrN), hafnium nitride (HfN), or tantalum nitride (TaN). In addition, the active layer 130 may include an electro-optic (EO) material whose dielectric permittivity changes when an electrical signal is applied. The EO material may include, for example, a crystalline material such as lithium niobate ($LiNbO_3$), lithium tantalate ($LiTaO_3$), potassium tantalate niobate (KTN), or lead zirconate titanate (PZT), or various polymers having EO properties.

The conductor 110 may include a conductive material. The conductor 110 may include the same material as the nano-antenna 150. The conductor 110 may include Cu, Al, Ni, Fe, Co, Zn, Ti, Ru, Rh, Pd, Pt, Ag, Os, Ir, Au, or an alloy thereof. The conductor 110 may include a thin film in which metal nanoparticles such as Au or Ag is dispersed, a carbon nanostructure such as graphene or carbon nanotube, a conductive polymer such as PEDOT, PPy, or P3HT, or a conductive oxide.

The dielectric layer 140 may include an insulating silicon compound or an insulating metal compound. The insulating silicon compound may include silicon oxide (SiOx), silicon nitride (SixNy), or silicon oxynitride (SiON), or the like. The insulating metal compound may include aluminum oxide ($Al_2O_3$), hafnium oxide (HfO), zirconium oxide (ZrO), or hafnium silicon oxide (HfSiO).

A charge of the active layer 130 may be an electron. When a positive (+) voltage is applied to the nano-antenna 150 using the first power supply 170, the first region A1 of the active layer 130 may be a charge accumulation region. When a negative (−) voltage is applied to the nano-antenna 150 using the first power supply 170, the first region A1 of the active layer 130 may be a charge depletion region.

Characteristics of the first region A1 may be controlled by using the first power supply 170, thereby light modulation characteristics of the beam steering device 100 may be varied. For example, when a certain incident light ($L_I$) is reflected by the nano-antenna 150, characteristics of reflected light ($L_R$) may be changed according to characteristics of the first region A1 of the active layer 130. In other words, an angle of reflection of the reflected light ($L_R$) may vary depending on a voltage applied to the nano-antenna 150 by the first power supply 170.

Figure 3:
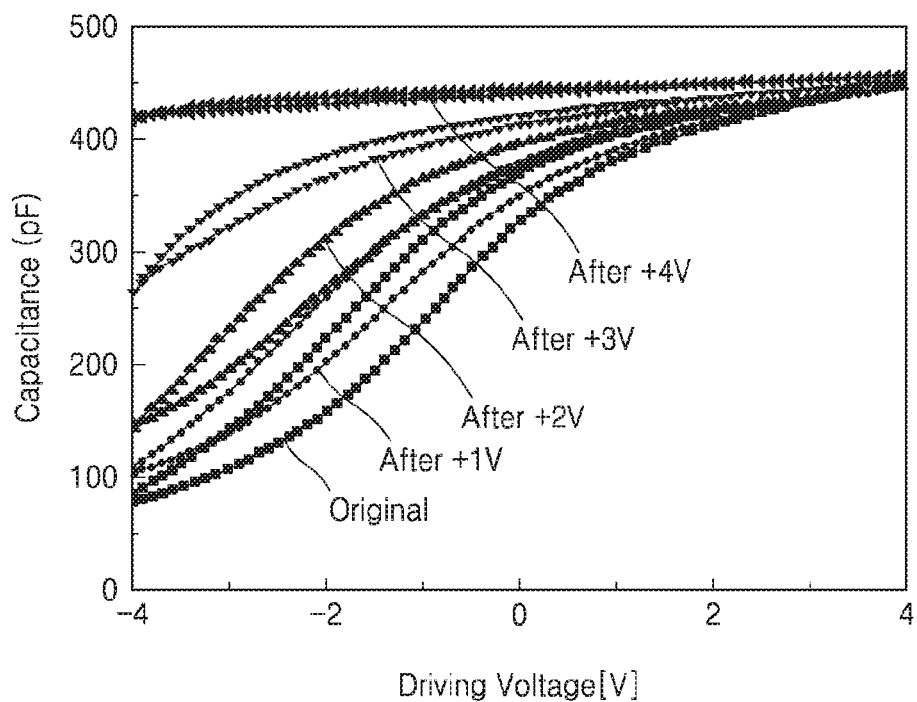
FIG. 3 is a graph showing capacitance hysteresis of a beam steering device according to an example embodiment.

FIG. 3 is a graph showing capacitance hysteresis of the beam steering device 100 according to an example embodiment. The capacitance hysteresis shows a hysteresis of a charge in a variable charge concentration region of the beam steering device 100. For example, the beam steering device 100 included the conductor 110 of Au with a 50 nm thickness, an ITO active layer with a 5 nm thickness, a HfO dielectric layer with a 8 nm thickness, and an antenna of Au with a 200 nm width and a 50 nm thickness.

Referring to FIG. 3, the first voltage V1 of 1, 2, 3, and 4 volts are respectively applied by the first power supply 170 and then a sweeping voltages of −4V to 4V is swept by the first power supply 170. The capacitance hysteresis increases as the first voltage V1 increases as compared with an original state. An extra residual charge is present in the first region A1 of the active layer 130 even if the sweeping voltage is applied by the first power supply 170 after a charge is accumulated in the first region A1 of the active layer 130 when a positive voltage is applied by the first power supply 170. The residual charge reduces a beam quality in a far-field. For example, a control of an angle of a beam that is reflected by the beam steering device may not be accurate.

Figure 4:
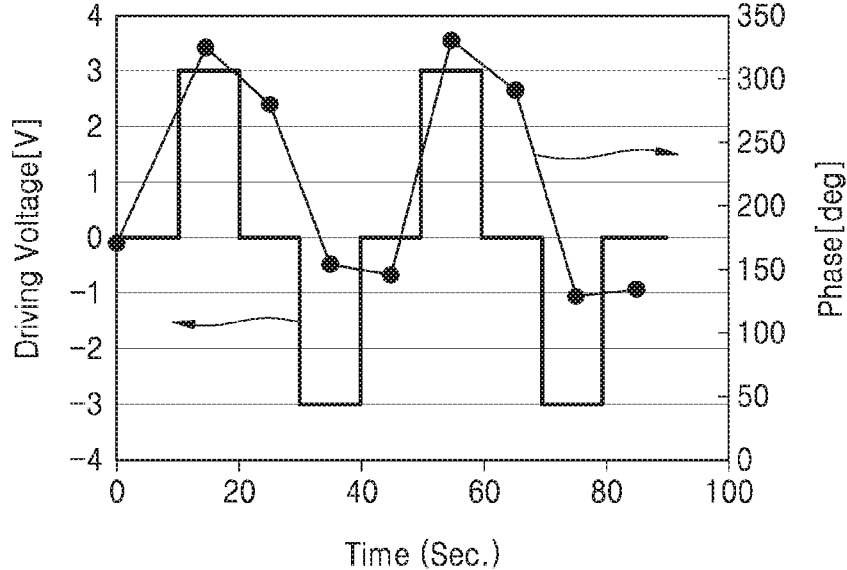
FIG. 4 is a graph showing a phase change of reflected light according to a driving voltage applied to a beam steering device according to an example embodiment.

FIG. 4 is a graph showing a phase change of reflected light according to a driving voltage applied to the beam steering device 100 according to an example embodiment.

Referring to FIG. 4, when a zero voltage was applied by the first power supply 170, a phase of reflected light is 175 degrees. After a first voltage of 3V was applied and then a zero voltage is applied again, the phase of the reflected light became 290 degrees. That is, the phase of the reflected light does not return to an original state of around 175 degrees even when the same zero voltage is applied again. As shown in FIG. 3, some charges accumulated in the first region A1 of the active layer 130 remain in the first region A1 without depletion when the zero voltage is applied thereto again.

When a −3V is applied by the first power supply 170, the phase of the reflected light returns to the original state That is, the residual charge in the first region A1 of the active layer 130 is depleted by applying a correction voltage which has a different electrical polarity from the first voltage of 3V.

Figure 5:
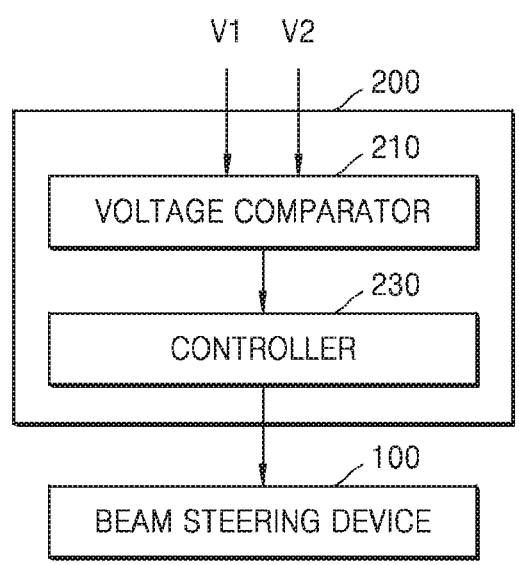
FIG. 5 is a block diagram schematically illustrating a driving system for a beam steering device including a metasurface optical phased array according to an example embodiment.

FIG. 5 is a block diagram schematically illustrating a driving system 200 for the beam steering device 100 including a metasurface optical phased array according to an example embodiment. A same reference numeral is used for a component substantially the same as a component of FIG. 1, and a detailed description thereof is omitted.

Referring to FIG. 5, the driving system 200 includes a voltage comparator 210 comparing applied voltages and a controller 230 controlling the first power supply 170 of the beam steering device 100 to apply a certain voltage.

The voltage comparator 210 compares an electrical polarity and an absolute level of the first voltage V1 to be applied to a first electrode which is one of the nano-antenna 150 and the conductor 110, with an electrical polarity and an absolute level of a second voltage V2 applied immediately before, thereby outputting a result to the controller 230. The result may be the first voltage V1, the second voltage V2, and a digital signal with respect to the result of the comparison thereabove.

The controller 230, based on the result, controls the first power supply 170 of the beam steering device 100 to output the first voltage V1 when the electrical polarity of the first voltage V1 is different from the electrical polarity of the second voltage V2 and when the electrical polarity of the first voltage V1 is the same as the electrical polarity of the second voltage V2 and the absolute level of the first voltage V1 is the same or greater than the absolute level of the second voltage V2.

When the electrical polarity of the first voltage V1 is the same as the electrical polarity of the second voltage V2 and the absolute level of the first voltage V1 is less than the absolute level of the second voltage V2, the controller 230 controls the first power supply 170 of the beam steering device 100 to output the correction voltage.

Figure 6:
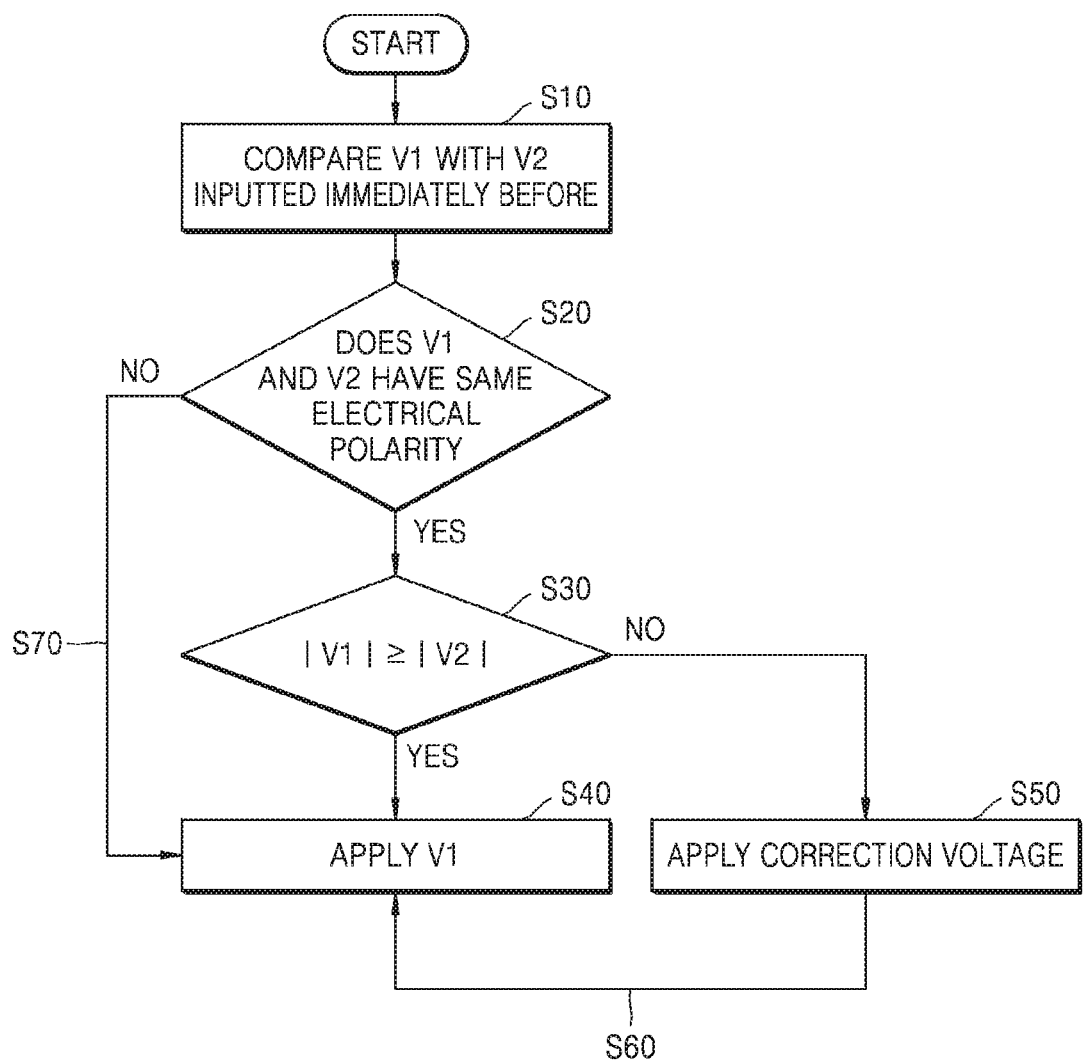
FIG. 6 is a flowchart of a driving method for a beam steering device including a metasurface optical phased array according to an example embodiment.

FIG. 6 is a flowchart of a driving method for the beam steering device 100 including a metasurface optical phased array according to an example embodiment. The driving method will now be described with the block diagram of FIG. 5 and the beam steering device 100 having a configuration of FIG. 1.

Referring to FIGS. 5 and 6, the voltage comparator 210 compares the first voltage V1 to be applied to the nano-antenna 150 with the second voltage V2 applied immediately before (S10).

The voltage comparator 210 determines whether an electrical polarity of the first voltage V1 is the same as an electrical polarity of the second voltage V2 (S20).

When the second voltage V2 is a voltage applied by the first power supply 170 and is positive, electrons in the active layer 130 move to and accumulate in the first region A1. A number of charges moved to the first region A1 of the active layer 130 may be proportional to an absolute level of the second voltage V2. When the second voltage V2 is a negative voltage, the electrons inside the active layer 130 are depleted from the first region A1. A number of charges moving from the first region A1 to the active layer 130 may be proportional to the absolute level of the second voltage V2.

When the voltage comparator 210 determines the electrical polarity of the first voltage V1 being the same as the electrical polarity of the second voltage V2 (S20—yes), the voltage comparator 210 then determines whether the absolute level of the first voltage V1 is the same as or greater than the absolute level of the second voltage V2 (S30). The voltage comparator 210 outputs a determined result to the controller 230.

When the absolute level of the first voltage V1 is the same as or greater than the absolute level of the second voltage V2 (S30—yes), the controller 230 controls the first power supply 170 of the beam steering device 100 to output the first voltage V1 (S40).

When the absolute level of the first voltage V1 is less than the absolute level of the second voltage V2 (S30—no), the controller 230 outputs the correction voltage to the first power supply 170 of the beam steering device 100 before applying the first voltage V1 (S50). Then, the controller 230 controls the first power supply 170 of the beam steering device 100 to output the first voltage V1 (S60).

The correction voltage may be a voltage having an electrical polarity different from the electrical polarity of the first voltage V1. For example, when both of the first voltage V1 and the second voltage V2 are positive voltages, the correction voltage is a negative voltage. When both of the first voltage V1 and the second voltage V2 are negative voltages, the correction voltage is a positive voltage.

Figure 7:
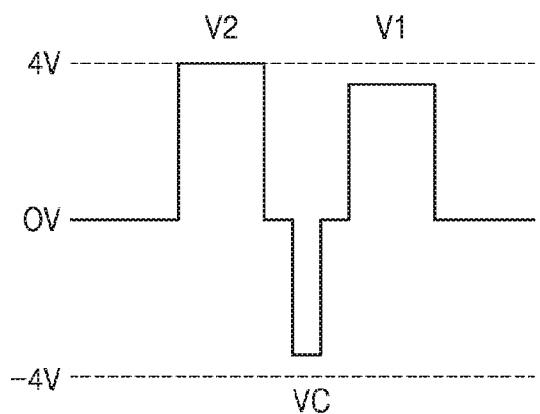
FIG. 7 is a timing diagram of applying a correction voltage in a beam steering device according to an example embodiment.

FIG. 7 is a timing diagram applying the correction voltage in the beam steering device 100 according to an example embodiment.

Referring to FIG. 7, when the first voltage V1 having the absolute value less than the second voltage V2 is applied after applying the second voltage V2, depletion of charges in the first region A1 of the active layer 130 does not sufficiently take place, and thus a desired phase change may not be obtained.

When a correction voltage VC having an electrical polarity different from that of the second voltage V2 is applied before applying the first voltage V1, a charge in the first region A1 of the active layer 130 moves to another region of the active layer 130. Thereafter, when the first voltage V1 is applied, a desired amount of charge may be accumulated in the first region A1, and accordingly, a phase change of reflected light by the beam steering device 100 is appropriately made.

An influence of an applied voltage may be referred to as a voltage weight. The voltage weight may be expressed by multiplying an absolute level of an applied voltage by a period of the applied voltage. A voltage weight of the correction voltage VC may be expressed by multiplying the absolute level of the correction voltage by the period of the correction voltage. An absolute level of the correction voltage VC may be less than the absolute level of the second voltage V2. The voltage weight of the correction voltage VC may be ¼ to ¾ of a voltage weight of the second voltage V2. When the voltage weight of the correction voltage VC is less than ¼ of the voltage weight of the second voltage V2, an effect of applying the correction voltage VC may be relatively small. When the voltage weight of the correction voltage VC is greater than ¾ of the voltage weight of the second voltage V2, the correction voltage VC may be too large to change properties of the first region A1. For example, the charge accumulation region may be changed to the charge depletion region and an angle of reflected light may not be changed as desired when the first voltage V1 is applied.

When the electrical polarity of the first voltage V1 is determined to be different from the electrical polarity of the second voltage V2 (S20—no), the first voltage V1 is applied (S70).

According to the driving method of the beam steering device 100 of the example embodiment, a charge in the variable charge concentration region of the active layer 130 may be restored to an original state by applying the correction voltage VC and an optical modulation may be more accurately performed by applying a driving voltage.

Figure 8:
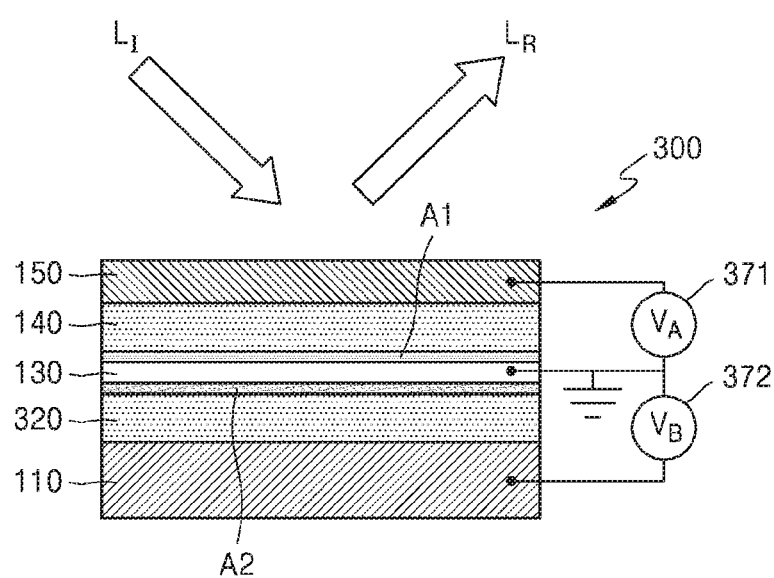
FIG. 8 is a cross-sectional view of a beam steering device including a metasurface optical phased array to which a driving method according to an example embodiment is applied.
Figure 9:
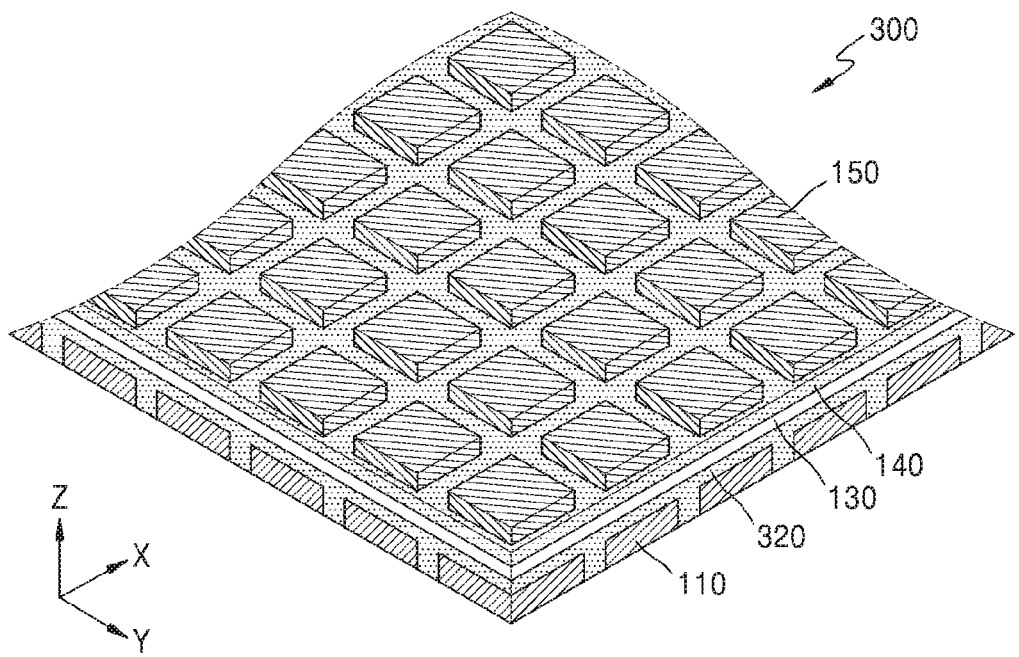
FIG. 9 is a partial perspective view of a beam steering device including a plurality of unit cells according to an example embodiment.

FIG. 8 is a cross-sectional view of a beam steering device 300 including a metasurface optical phased array to which a driving method according to an example embodiment is applied. The beam steering device 300 may include unit cells arranged in a one-dimensional or two-dimensional manner. FIG. 8 shows one unit cell of the beam steering device 300. FIG. 9 is a partial perspective view of the beam steering device 300 including a plurality of unit cells. FIG. 9 shows the nano-antennas 150 arranged two-dimensionally in parallel with each other. However, embodiments are not limited thereto. The nano-antennas 150 and the conductors 110 may be arranged one-dimensionally to correspond to each other. A one-dimensional arrangement of the nano-antennas 150 is shown in FIG. 2. A same reference numerals are used for a same component substantially the same as a component of the beam steering device 100 of FIGS. 1 and 2, and a detailed description thereof is omitted.

Referring to FIGS. 8 and 9, the beam steering device 300 further includes a second dielectric layer 320 formed between the conductor 110 and the active layer 130. A first power supply 371 is connected to the nano-antenna 150 and a second power supply 372 is connected to the conductor 110. The second power supply 372 applies a driving voltage to the conductor 110 independently from the first power supply 371. A second region A2 which is affected by a voltage applied to the second power supply 372 may be formed in the active layer 130. In the active layer 130, the second region A2 may be formed on the active layer opposite to the first region A1.

A second dielectric layer 320 may include a same material as the dielectric layer 140.

Characteristics of the first region A1 and the second region A2 may be independently controlled by using the first power supply 371 and the second power supply 372, and accordingly, light modulation characteristics of the beam steering device 300 may be changed. The light modulation characteristics may be controlled by a change in the characteristics of the active layer 130 and an interaction between the nano-antenna 150, the active layer 130, and the conductor 110. For example, when a certain incident light ($L_I$) is reflected by the nano-antenna 150, characteristics of reflected light ($L_R$) may be changed according to characteristics of the first region A1 and the second region A2 of the active layer 130. In other words, the characteristics of the reflected light ($L_R$) may be changed according to a voltage applied to the conductor 110 by the second power supply 372 and a voltage applied to the nano-antenna 150 by the first power supply 371. Since the characteristics of the first region A1 and the second region A2 are independently controlled, a change in the light modulation characteristics of the beam steering device 300 may be greater than when only a first region A1 of the active layer 130 is controlled.

The driving method of the beam steering device 300 by using the first power supply 371 is substantially the same as the driving method of the beam steering device 100 described above, and thus a detailed description thereof will be omitted.

The driving method of the beam steering device 300 by using the second power supply 372 is similar to the driving method of the beam steering device 100 described above, and thus a detailed description thereof will be omitted.

Figure 10:
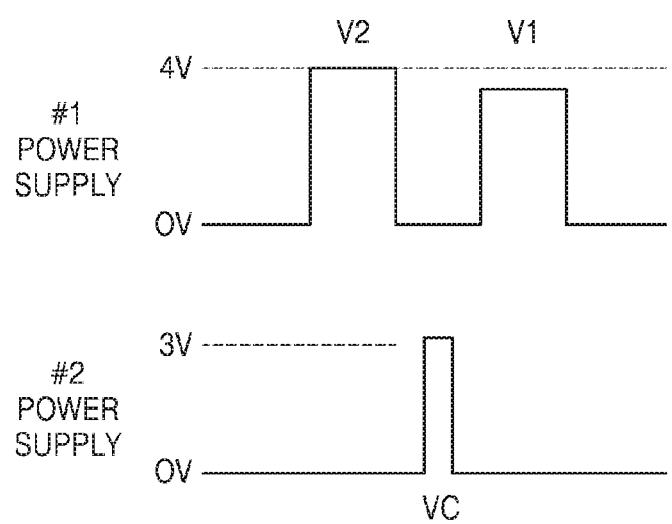
FIG. 10 is a timing diagram of applying a correction voltage in a beam steering device according to an example embodiment.

FIG. 10 is a timing diagram applying a correction voltage VC in the beam steering device 300 according to an example embodiment. That is, a driving voltage may be applied by one of the first power supply 371 and the second power supply 372, and the correction voltage VC may be applied by the other of the first power supply 371 and the second power supply 372.

Referring to FIG. 10, the driving voltage, the second voltage V2, may be applied to one of the nano-antenna 150 and the conductor 110. For example, the driving voltage V2 may be applied to the nano-antenna 150 and then the correction voltage VC may be applied before applying the first voltage V1, and the correction voltage VC is applied to the conductor 110. The correction voltage VC at this time is a voltage having the same electrical polarity as the second voltage V2. However, embodiments are not limited thereto. For example, the driving voltage may be applied to the conductor 110 and the correction voltage VC may be applied to the nano-antenna 150.

A period of the correction voltage VC may be less than a period of the second voltage V2.

An influence of an applied voltage may be referred to as a voltage weight. The voltage weight may be expressed by multiplying an absolute level of an applied voltage by a period of the applied voltage. A voltage weight of the correction voltage VC may be multiplying the absolute level of the correction voltage by the period of the correction voltage. An absolute level of the correction voltage VC may be less than the absolute level of the second voltage V2. The voltage weight of the correction voltage VC may be ¼ to ¾ of a voltage weight of the second voltage V2. When the voltage weight of the correction voltage VC is less than ¼ of the voltage weight of the second voltage V2, an effect of applying the correction voltage VC may be relatively small. When the voltage weight of the correction voltage VC is greater than ¾ of the voltage weight of the second voltage V2, the correction voltage VC may be too large to change properties of the first region A1. For example, the charge accumulation region may be changed to the charge depletion region and an angle of reflected light may not be changed as desired when the first voltage V1 is applied.

According to the driving method of the beam steering device 300 of the example embodiment, a charge in the variable charge concentration region of the active layer 130 may be restored to an original state by applying the correction voltage VC and an optical modulation may be more accurately performed by applying a driving voltage.

Further, since two variable charge concentration regions of the active layer may be independently controlled, the light modulation characteristics of the beam steering device 300 may be more efficiently controlled.

A configuration of the driving system of the beam steering device 300 according to an example embodiment is substantially the same as that of the driving system 200 of FIG.

5, and the driving method of the beam steering device 300 will now be described using the driving system 200 of FIG. 5.

The controller 230 of the driving system of the beam steering device 300 controls the first power supply 271 and the second power supply 272 of the beam steering device 300 to output certain applied voltages.

The driving method of the beam steering device 300 is similar to the above description, and thus a detailed description thereof will be omitted.

It should be understood that example embodiments described herein should be considered in a descriptive sense only and not for purposes of limitation. Descriptions of features or aspects within each embodiment should typically be considered as available for other similar features or aspects in other example embodiments While example embodiments have been described with reference to the figures, it will be understood by those of ordinary skill in the art that various changes in form and details may be made therein without departing from the spirit and scope as defined by the following claims.

What is claimed is:

1. A driving system of a beam steering device having a metasurface optical phased array, the beam steering device comprising a nano-antenna, a conductor, and an active layer disposed between the nano-antenna and the conductor, the driving system comprising:
    a voltage comparator configured to compare an electrical polarity and an absolute level of a first voltage to be applied to a first electrode of one of the nano-antenna and the conductor, with an electrical polarity and an absolute level of a second voltage which was applied to the first electrode of the one of the nano-antenna and the conductor immediately before the first voltage is to be applied to the first electrode of the one of the nano-antenna and the conductor, and output a result of the comparison; and
    a controller configured to control a power supply of the beam steering device to output, based on the result of the comparison output from the voltage comparator, the first voltage which is applied the first electrode of the one of the nano-antenna and the conductor when the electrical polarity of the first voltage is different from the electrical polarity of the second voltage and when the electrical polarity of the first voltage is the same as the electrical polarity of the second voltage and the absolute level of the first voltage is the same as or greater than the absolute level of the second voltage, and to control the power supply of the beam steering device to output a correction voltage when the electrical polarity of the first voltage is the same as the electrical polarity of the second voltage and the absolute level of the first voltage is less than the absolute level of the second voltage.

2. The driving system of claim 1, wherein an electrical polarity of the correction voltage is different from the electrical polarity of the second voltage.

3. The driving system of claim 1, wherein an absolute level of the correction voltage is less than the absolute level of the second voltage.

4. The driving system of claim 1, wherein a voltage weight of the correction voltage obtained by multiplying an absolute level of the correction voltage by a period of the correction voltage is less than a voltage weight of the second voltage obtained by multiplying the absolute level of the second voltage by a period of the second voltage.

5. The driving system of claim 4, wherein the voltage weight of the correction voltage is ¼ to ¾ of the voltage weight of the second voltage.

6. The driving system of claim 1, wherein the correction voltage is applied to the first electrode.

7. The driving system of claim 1, wherein the beam steering device comprises a first dielectric layer disposed between the active layer and the conductor, and a second dielectric layer disposed between the active layer and the nano-antenna, and the first voltage and the second voltage are applied to the first electrode, and
    wherein the correction voltage is applied to a second electrode of the other one of the nano-antenna and the conductor.

8. The driving system of claim 7, wherein an electrical polarity of the correction voltage is the same as the electrical polarity of the second voltage.

9. A driving method for a beam steering device that has a metasurface optical phased array, wherein the beam steering device comprising a nano-antenna, a conductor, and an active layer disposed between the nano-antenna and the conductor, the driving method comprises:
    comparing a first voltage to be applied to a first electrode of one of the nano-antenna and the conductor, with a second voltage that was applied to the first electrode of the one of the nano-antenna and the conductor immediately before the first voltage is to be applied to the first electrode; and
    applying a correction voltage prior to applying the first voltage to the first electrode of the one of the nano-antenna and the conductor,
    wherein the applying of the correction voltage comprises:
        determining whether an electrical polarity of the first voltage is the same as an electrical polarity of the second voltage;
        determining whether an absolute level of the first voltage is the same as or greater than an absolute level of the second voltage when the electrical polarity of the first voltage is determined to be the same as the electrical polarity of the second voltage;
        applying the first voltage when the absolute level of the first voltage is the same as or greater than the absolute level of the second voltage;
        applying the correction voltage and then applying the first voltage when the absolute level of the first voltage is less than the absolute level of the second voltage; and
        applying the first voltage when the electrical polarity of the first voltage is different from the electrical polarity of the second voltage.

10. The driving method of claim 9, wherein an electrical polarity of the correction voltage is different from the electrical polarity of the second voltage.

11. The driving method of claim 9, wherein an absolute level of the correction voltage is less than the absolute level of the second voltage.

12. The driving method of claim 9, wherein a voltage weight of the correction voltage obtained by multiplying an absolute level of the correction voltage by a period of the correction voltage is less than a voltage weight of the second voltage obtained by multiplying the absolute level of the second voltage by a period of the second voltage.

13. The driving method of claim 12, wherein the voltage weight of the correction voltage is ¼ to ¾ of the voltage weight of the second voltage.

14. The driving method of claim 9, wherein the correction voltage is applied to the first electrode.

15. The driving method of claim 9, wherein the beam steering device comprises a first dielectric layer disposed between the active layer and the conductor, and a second dielectric layer disposed between the active layer and the nano-antenna, the first voltage and the second voltage are applied to the first electrode and wherein the correction voltage is applied to a second electrode of the other one of the nano-antenna and the conductor.

16. The driving method of claim 15, wherein an electrical polarity of the correction voltage is same as the electrical polarity of the second voltage.

17. The driving method of claim 15, wherein an absolute level of the correction voltage is less than the absolute level of the second voltage.

18. The driving method of claim 15, wherein a voltage weight of the correction voltage obtained by multiplying an absolute level of the correction voltage by a period of the correction voltage is less than a voltage weight of the second voltage obtained by multiplying the absolute level of the second voltage by a period of the second voltage.

19. The driving method of claim 18, wherein the voltage weight of the correction voltage is $\frac{1}{4}$ to $\frac{3}{4}$ of the voltage weight of the second voltage.

* * * * *